(12) United States Patent
Kaneda et al.

(10) Patent No.: US 9,073,110 B2
(45) Date of Patent: Jul. 7, 2015

(54) FIN PROCESSING APPARATUS

(71) Applicant: CALSONIC KANSEI CORPORATION, Saitama-shi, Saitama (JP)

(72) Inventors: Teruhisa Kaneda, Saitama (JP);
Minoru Tsuchiya, Saitama (JP);
Makoto Kobayashi, Saitama (JP)

(73) Assignee: CALSONIC KANSEI CORPORATION, Saitama-shi (JP)

( * ) Notice: Subject to any disclaimer, the term of this patent is extended or adjusted under 35 U.S.C. 154(b) by 165 days.

(21) Appl. No.: 13/854,524

(22) Filed: Apr. 1, 2013

(65) Prior Publication Data
US 2013/0255345 A1    Oct. 3, 2013

(30) Foreign Application Priority Data

Apr. 3, 2012 (JP) ................. 2012-084541
Mar. 14, 2013 (JP) ................. 2013-051760

(51) Int. Cl.
*B21D 13/08* (2006.01)
*B23P 15/26* (2006.01)
*B21D 13/02* (2006.01)
*B21D 13/04* (2006.01)

(52) U.S. Cl.
CPC ............... *B21D 13/08* (2013.01); *B23P 15/26* (2013.01); *B21D 13/02* (2013.01); *B21D 13/04* (2013.01)

(58) Field of Classification Search
CPC ........ B21D 13/00; B21D 13/02; B21D 13/04; B21D 13/08; B23P 15/26

USPC ................................. 72/379.6, 385
See application file for complete search history.

(56) References Cited

U.S. PATENT DOCUMENTS 2,397,582 A * 4/1946 Watt et al. ................. 72/403
4,030,330 A * 6/1977 Nyssen et al. ............. 72/105

FOREIGN PATENT DOCUMENTS

| CN | 101952063 A | 1/2011 |
|----|-------------|--------|
| CN | 202129345 U | 2/2012 |
| DE | 28 09 365 A1 | 9/1979 |
| EP | 2 208 550 A2 | 7/2010 |
| JP | 58-013415 A | 1/1983 |
| JP | 2009-078276 A | 4/2009 |
| WO | WO 2009/048272 A2 | 4/2009 |

* cited by examiner

*Primary Examiner* — Teresa M Ekiert
(74) *Attorney, Agent, or Firm* — Foley & Lardner LLP

(57) ABSTRACT

Disclosed is a fin processing apparatus including an upper pressing die (1) and a lower pressing die (2) placed apart from each other and capable of coming close to and away from each other, a corrugating mechanism (3) disposed between the pressing dies (1, 2) for continuously forming a plurality of consecutive corrugated members (Fa) from a flat plate (Fo) which is a workpiece material, the consecutive corrugated member (Fa) having a predetermined number of crest portions, and a restriking mechanism (4) disposed between both pressing dies (1, 2) for simultaneously restrike-forming a plurality of crest and trough portions of the consecutive rectangle member (Fb) from the consecutive corrugated member (Fa). The corrugating mechanism (3) and the restriking mechanism (4) are provided integrally.

10 Claims, 7 Drawing Sheets

ONE CREST (ONE PITCH) OF CONSECUTIVE CORRUGATED MEMBER

RESTRIKED FIN (FINAL PART)

| VALUES OF ESSENTIAL SIZE OF CORRUGATED FIN | MATERIAL BREAKING RANGE | LIMIT RANGE OF PADDING ON RESTRIKED ARTICLE |
|---|---|---|
| FIN HEIGHT (mm) | 2.33 | 2.59 |
| FIN PITCH (mm) | 3.21 | 3.19 |
| DEVELOPED LENGTH (mm) | 5.78 | 6.28 |
| OUTER RADIUS (mm) | 0.5 | 0.5 |
| INNER RADIUS (mm) | 0.4 | 0.4 |
| TROUGH ANGLE OF MATERIAL (°) | 65 | 68 |

FIG. 6

|  | MAXIMUM OFFSET IN DIE (FOUR CRESTS) | AMOUNT OF OFFSET (DIE PITCH - FIN PITCH) | WHEN AMOUNT OF ACCUMULATED VARIATION IS 0 mm | WHEN MAXIMUM AMOUNT OF ACCUMULATED VARIATION IS 0.29 mm |
|---|---|---|---|---|
| FIN PITCH 3.16 | 12.64 | −0.48 | −0.48 | 0.02 |
| DIE PITCH 3.28 | 13.12 | | | |
| FIN PITCH 3.33 | 12.33 | 0.2 | 0.2 | 0.49 |
| DIE PITCH 3.28 | 13.12 | | | |

FIG. 7

| | MAXIMUM OFFSET IN DIE (FOUR CRESTS) | AMOUNT OF OFFSET (DIE PITCH - FIN PITCH) | WHEN AMOUNT OF ACCUMULATED VARIATION IS 0 mm | WHEN MAXIMUM AMOUNT OF ACCUMULATED VARIATION IS 0.50 mm |
|---|---|---|---|---|
| FIN PITCH 3.16 | 12.64 | | | |
| DIE PITCH 3.28 | 13.12 | −0.48 | −0.48 | 0.02 |
| FIN PITCH 3.28 | 12.12 | | | |
| DIE PITCH 3.28 | 13.12 | 0 | 0 | 0.5 |

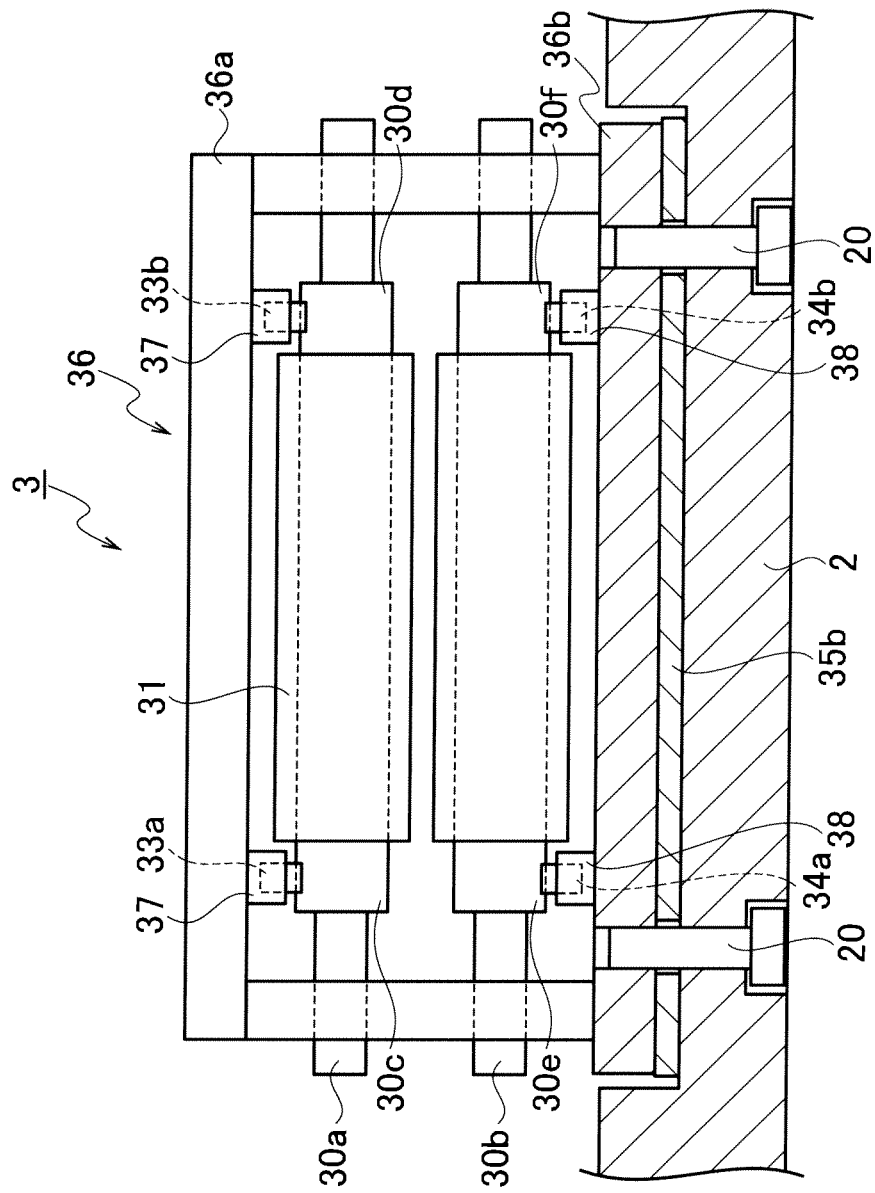

FIN PROCESSING APPARATUS

BACKGROUND OF THE INVENTION

1. Field of the Invention

The present invention relates to a fin processing apparatus that corrugates a flat plate to obtain a consecutive corrugated member in a first step, processes the consecutive corrugated member into a consecutive rectangle member in a second step, and finally obtains a restriked fin to be used in a heat exchanger.

2. Related Background of the Invention

A fin processing apparatus described in Patent Document 1 is known as a conventional fin processing apparatus. This conventional fin processing apparatus corrugates a flat plate to form a consecutive corrugated member in a corrugation step having one crest, with one male projection provided on a male mold which moves up and down, and one groove forming unit constituted by a first die member and a second die member which is provided on the male mold and open and close according to the up and down movement of the male mold. At the downstream of the location where corrugation is performed, the top and bottom of a corrugated plate are simultaneously restriked with a first strike projection, a second strike projection and a restrike groove positioned therebetween, which are provided on the male mold, and a first positioning projection, a second positioning projection and a positioning groove positioned therebetween, which are provided on the male mold, thereby providing a final consecutive corrugated member (restriked fin) with a desired shape.

PRIOR ART DOCUMENT

Patent Document

[Patent Document 1] Japanese Patent Application Laid-Open No. 2009-78276

SUMMARY OF THE INVENTION

However, while the above-mentioned conventional fin processing apparatus is configured to execute corrugation and restriking with the same apparatus to reduce the necessary exclusive area of the apparatus, those processes can be performed on only one crest and one trough (one pitch).

That is, in corrugating a flat plate or restriking a corrugated plate, even if a feeder is set to a grip type to provide a constant feed amount of a workpiece material (flat plate or consecutive corrugated member in a corrugation step), it is not possible to avoid a change in the pitch of the crests and troughs of a workpiece member. As a result, in simultaneously forming a plurality of crests on the workpiece member, even if the positions of the crests of the workpiece member are aligned for a work at the time of corrugating, the positions of the crests of the workpiece member for press punching at the time of restriking are misaligned, resulting in defective moldings.

Therefore, the above-mentioned conventional fin processing apparatus performs corrugating and restriking on a single crest of a workpiece member, that is, by one pitch. In this case, there is a problem that driving and stopping of the motor of the apparatus should be repeated crest by crest, which lowers the production efficiency.

The forming speed may be increased to improve the production efficiency by continuously forming a plurality of crests at a time by sliding roller pins while rotating the roller pins on a bend punch. However, this method needs frequent adjustment, replacement and the like according to wearing of the roller pins and the bend punch, making it very difficult to manage the precision. This undesirably leads to deterioration of the production efficiency and cost increase.

The present invention is made in consideration of the foregoing problem, and it is an object of the present invention to provide a fin processing apparatus that achieves corrugation capable of continuously forming a plurality of crests on a workpiece member and restrike capable of simultaneously forming a plurality of crests on the same apparatus at low cost, while suppressing the exclusive area of the apparatus, thereby improving the production efficiency.

To achieve the above mentioned object, a fin processing apparatus according to an embodiment of the present invention includes an upper pressing die and a lower pressing die placed apart from each other and capable of coming close to and away from each other; a corrugating mechanism disposed between the upper pressing die and the lower pressing die for continuously forming a plurality of consecutive corrugated members in a corrugation step from a flat plate which is a workpiece material, the consecutive corrugated member having a predetermined number of crest portions; and a restriking mechanism disposed between the upper pressing die and the lower pressing die for simultaneously restrike-forming a plurality of crest and trough portions of the consecutive rectangle member in the restrike step from the consecutive corrugated member, wherein the corrugating mechanism and the restriking mechanism are provided integrally.

In the fin processing apparatus according to an embodiment of the present invention, a base is provided between the corrugating mechanism and the restriking mechanism to receive the consecutive corrugated member in the corrugation step which is conveyed from the corrugating mechanism to the restriking mechanism.

In the fin processing apparatus according to an embodiment of the present invention, the corrugating mechanism includes a pair of forming gears which carries out corrugation with the flat plate placed in between.

In the fin processing apparatus according to an embodiment of the present invention, the corrugating mechanism is provided with a plurality of backup members rotatably supporting the pair of forming gears.

In the fin processing apparatus according to an embodiment of the present invention, a vibration absorber formed of an elastic member is provided below a support frame which accommodates the pair of forming gears.

In the fin processing apparatus according to an embodiment of the present invention, the support frame is mounted above the lower pressing die via the vibration absorber, and a rod member extending in a vertical direction is provided between the lower pressing die and the support frame.

In the fin processing apparatus according to an embodiment of the present invention, a length of conveyance of the consecutive corrugated member in the corrugation step formed by the pair of forming gears is synchronized with a length of conveyance of the consecutive rectangle member in a restrike step formed by the restriking mechanism.

In the fin processing apparatus according to an embodiment of the present invention, a cutoff mechanism that cuts off the consecutive rectangle member at downstream of the restriking mechanism to obtain a final part is provided between the upper pressing die and the lower pressing die, and crest and trough portions to be simultaneously restriked by the restriking mechanism are set in such a way as to be equal in number to crest and trough portions of the final part obtained by simultaneous cutting by the cutoff mechanism.

In the fin processing apparatus according to an embodiment of the present invention, the cutoff mechanism provides two final parts in a cutoff step of the consecutive rectangle member.

In the fin processing apparatus according to an embodiment of the present invention, a formable limit distance between the corrugating mechanism and the restriking mechanism is set equal to or less than 140 mm.

In the fin processing apparatus according to an embodiment of the present invention, the consecutive corrugated member in the corrugation step has a developed length of one pitch set in a range of 5.78 mm or greater and 6.28 mm or less.

In the fin processing apparatus according to an embodiment of the present invention, the consecutive corrugated member in the corrugation step has one pitch set in a range of 3.16 mm or greater and 3.33 mm or less.

According to an embodiment of the fin processing apparatus of the present invention, the corrugating mechanism and the restriking mechanism are provided integrally to reduce the space therebetween, thus suppressing breaking of a workpiece material or occurrence of padding in a workpiece member while reducing the exclusive area of the apparatus, so that corrugation capable of continuously forming a plurality of crests on the workpiece member and restriking capable of simultaneously forming a plurality of crests on the same apparatus at low cost can be carried out, thereby improving the production efficiency.

According to an embodiment of the fin processing apparatus of the present invention, at the time of conveying a consecutive corrugated member in a corrugation step from the corrugating mechanism to the restriking mechanism, this consecutive corrugated member is received on the base provided between the corrugating mechanism and the restriking mechanism, thereby suppressing dead-weight originated sagging of the conveyed consecutive corrugated member. This makes it possible to reduce expansion between fin pitches of the consecutive corrugated member.

According to an embodiment of the fin processing apparatus of the present invention, corrugation is carried out with a pair of forming gears, so that the maintenance and management costs can be reduced as compared with the case of corrugation using roller pins. In addition, both of corrugation and conveyance of the consecutive corrugated member can be carried out with the forming gears.

According to an embodiment of the fin processing apparatus of the present invention, a pair of forming gears can be rotatably supported by a plurality of backup members provided on the corrugating mechanism, so that deflection of the pair of forming gears can be reduced.

According to an embodiment of the fin processing apparatus of the present invention, vibration is absorbed by the vibration absorber provided below the support frame of the restriking mechanism, so that vibration which occurs on the forming gears during corrugation or vibration which is transmitted to the forming gears via the support frame can be suppressed.

According to an embodiment of the fin processing apparatus of the present invention, the support frame of the restriking mechanism is mounted above the lower pressing die via the vibration absorber, and the rod member provided between the lower pressing die and the support frame and extending vertically is engaged with the support frame, thus preventing the pair of forming gears accommodated in the support frame from being turned down horizontally.

According to an embodiment of the fin processing apparatus of the present invention, the length of conveyance (feeding amount) of the consecutive corrugated member in the corrugation step formed by the pair of forming gears is synchronized with the length of conveyance of the consecutive rectangle member in the restrike step formed by the restriking mechanism, so that the precision between the fin pitches of the consecutive corrugated member can be maintained and improved.

According to an embodiment of the fin processing apparatus of the present invention, all of the corrugation step, the restrike step and the cutoff step can be executed interlockingly with the same apparatus, and, in addition, the corrugation step has only to be interrupted for a plurality of final parts, thus further improving the production efficiency as compared with the case of interrupting the corrugation step for each final part.

According to an embodiment of the fin processing apparatus of the present invention, the cutoff mechanism provides two final parts in the cutoff step of the consecutive rectangle member, which also ensures improvement on the production efficiency.

According to an embodiment of the fin processing apparatus of the present invention, the formable limit distance between the corrugating mechanism and the restriking mechanism is set equal to or less than 140 mm, so that breaking of the workpiece material or occurrence of padding in the workpiece member can be suppressed while reducing the exclusive area of the apparatus. It should be noted that the limit distance ensures formation of six crests as a typical example.

The fin processing apparatus according to an embodiment of the present invention can provide a shape of high cooling efficiency. At this time, the consecutive corrugated member is not broken during the transition from the corrugation step to the restriking step, and occurrence of padding after the restriking step can be prevented.

According to an embodiment of the fin processing apparatus of the present invention, in the restriking step, misalignment of the pitches of the crest and trough portions of the consecutive corrugated member in the corrugation step with the pitches of restrike teeth of the restriking mechanism is suppressed within an allowable range, thus making it possible to prevent deficiency originating from misaligned-pitched restriking.

BRIEF DESCRIPTION OF THE DRAWINGS

FIG. 6 is a diagram illustrating a table showing experimental results for determining the size range of the pitches of a consecutive corrugated member where a consecutive corrugated member can be formed to avoid breaking of a consecutive corrugated member during the transition from the corrugation step to the restrike step and misaligned restriking in the restrike step.

FIG. 7 is a diagram illustrating a table showing experimental results for determining the range of the maximum distance from a corrugating position to a restriking position.

FIG. 8A is a side view showing forming gears in a corrugating unit provided in the fin processing apparatus according to the present embodiment, and a backup member. FIG. 8B is a front view of the corrugating unit provided in the fin processing apparatus according to the present embodiment.

DESCRIPTION OF THE PREFERRED EMBODIMENTS

An embodiment of the present invention is described in detail hereinbelow referring to the accompanying drawings. First, the fin processing apparatus according to the present embodiment is used to form a fin to be used in a heat exchanger for an automobile (not shown). This fin is an inner fin disposed at an inside of a tube specifically, and the heat exchanger can be used for an evaporator, a condenser or an intercooler (charge air-cooler). It should be noted that this fin can be used for an outer fin accelerating heat exchanging with the air.

Figure 1:
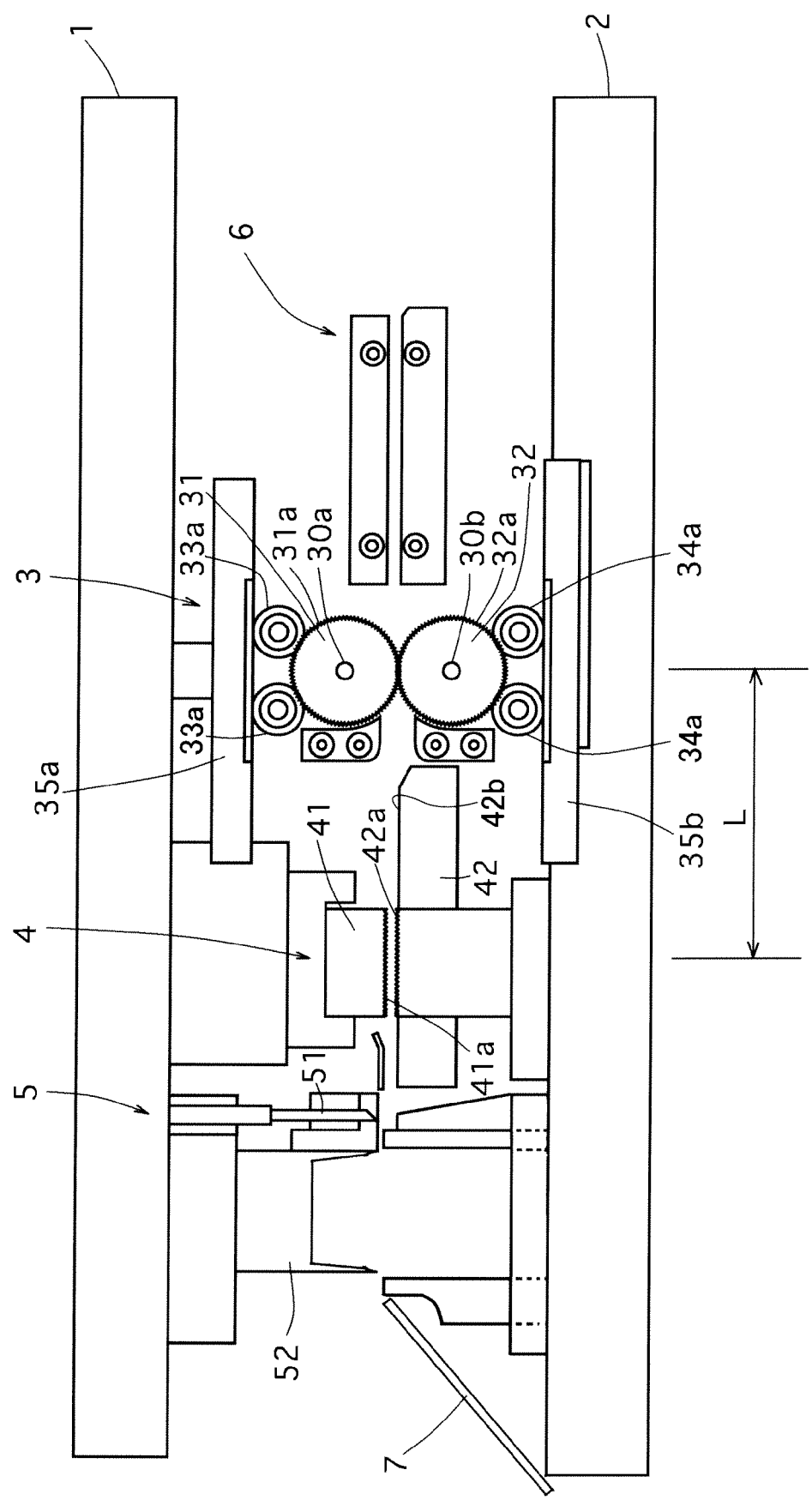
FIG. 1 is a side view showing a fin processing apparatus according to one embodiment of the present invention.
Figure 2:
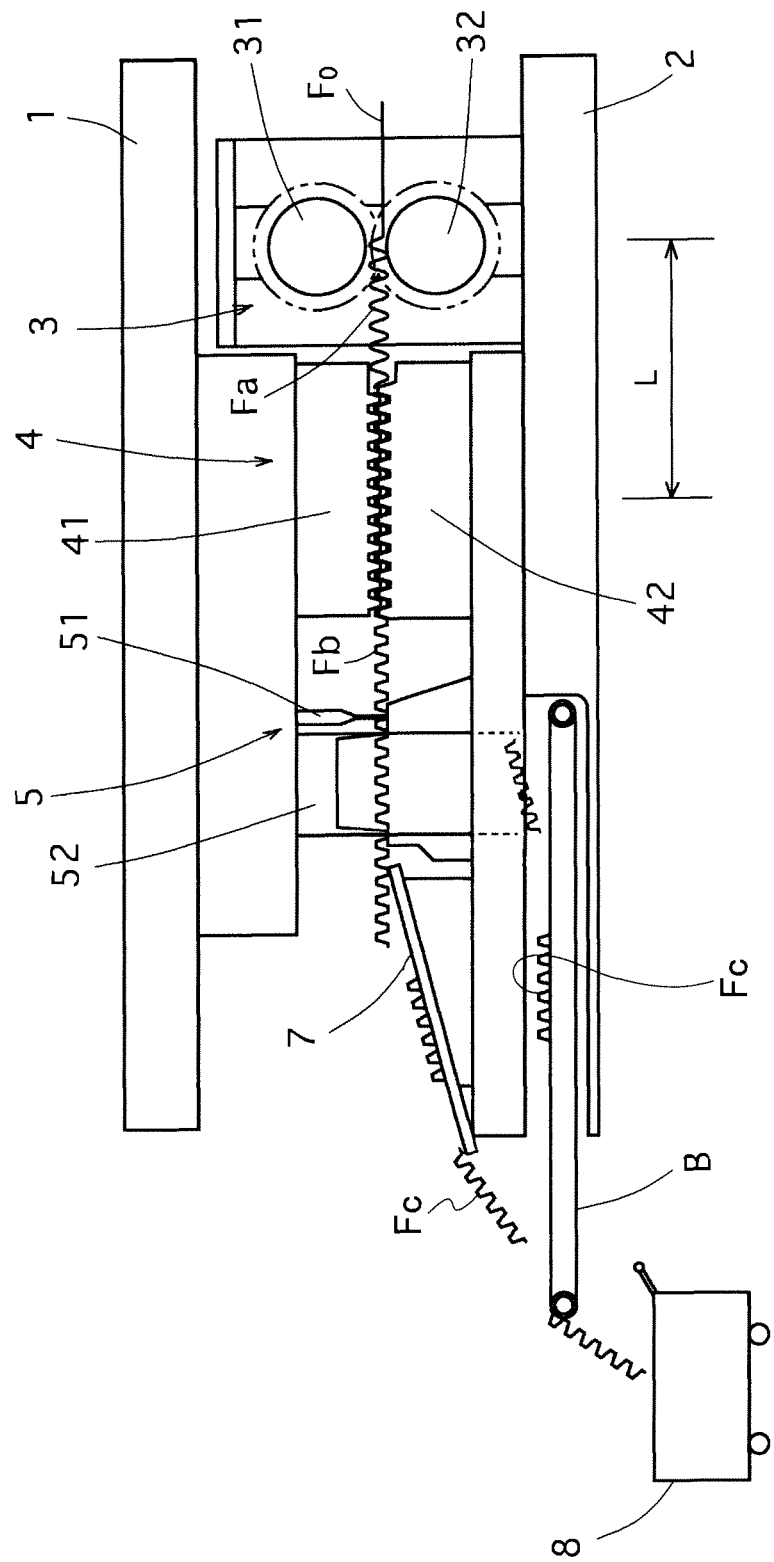
FIG. 2 is a diagram showing the essential portion of the fin processing apparatus according to the present embodiment, and the state of a restriked fin which is processed in the essential portion.

FIG. 1 shows the general view of a fin processing apparatus according to the present embodiment, and FIG. 2 shows the essential portion of the fin processing apparatus, and a restriked fin Fc which is processed in the essential portion. As shown in FIG. 2, the restriked fin Fc is formed in such a way that the restriked fin Fc changes its shape or the like from a flat plate Fo, to a consecutive corrugated member Fa in a corrugation step, then to a consecutive rectangle member Fb in a restrike step, and finally to the restriked fin Fc according to the processing steps, and is conveyed leftward from the right-hand side in the diagram. The members Fo, Fa, Fb before the formation of the restriked fin Fc are equivalent to a workpiece member according to the present invention.

As shown in FIGS. 1 and 2, the fin processing apparatus has a corrugating unit 3, a restriking unit 4 and a cutoff unit 5 integrally incorporated between an upper pressing die 1 and a lower pressing die 2.

The upper pressing die 1 is vertically movable with respect to the lower pressing die 2 fixed to a floor or the like in a factory, and the vertical movement is achieved by hydraulic cylinders (not shown) respectively disposed at the upstream end and the downstream end between the upper pressing die 1 and the lower pressing die 2.

A roll on which the aluminum-based flat plate Fo which eventually becomes the restriked fin Fc is wound is rotatably supported on the upstream side of the fin processing apparatus, so that the flat plate Fo can be supplied to the fin processing apparatus.

A posture stabilizer 6 which guides the supplied flat plate Fo while holding the flat plate Fo from above and below to enable feeding of the flat plate to the corrugating unit 3 from a horizontal direction in a stable posture is provided on the upstream side of the corrugating unit 3 between the upper pressing die 1 and the lower pressing die 2.

Figure 3A:
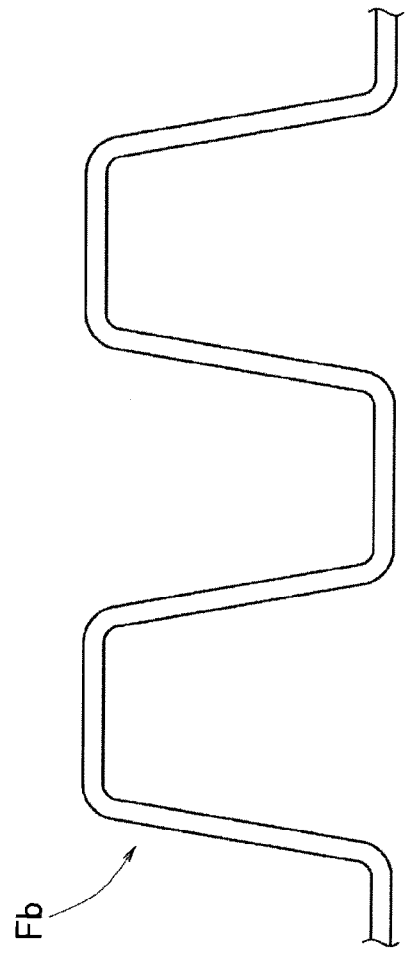
FIG. 3A is a side view showing the shape of one crest (one pitch) of a consecutive corrugated member corrugated with the fin processing apparatus according to the present embodiment.

The corrugating unit 3 has a pair of forming gears 31, 32 respectively connected to shafts 30a, 30b which are vertically separated from each other and rotatably supported via bearings (not shown). As the flat plate Fo supplied from the posture stabilizer 6 passes through formed teeth 31a, 32a which are respectively formed on the outer peripheries of those forming gears 31, 32, the flat plate Fo is formed into a wave pattern-formed material (consecutive corrugated member Fa) in a corrugation step which has a smooth curved surface as shown in FIG. 3A. This step is equivalent to a corrugation step. The corrugating unit 3 is equivalent to the corrugating mechanism according to the present invention.

Therefore, using the forming gears 31, 32, the corrugating unit 3 has not only a capability of forming the flat plate Fo in a corrugated form in the corrugation step, but also a feeder capability of feeding this flat plate Fo and the consecutive corrugated member Fa, obtained by processing the flat plate Fo, to the downstream side.

The shaft 30b of the lower forming gear 32 is coupled to the output shaft of a servo motor (not shown) disposed on a side of the tin processing apparatus via a joint to be drivable.

This servo motor is intermittently controlled as follows by a controller (not shown). The controller controls the servo motor to ensure intermittent formation with the forming gears 31, 32 in such a way that the flat plate Fo supplied by the formed teeth 31a, 32a by rotating the forming gears 31, 32 by a plurality of crests and troughs that ensure simultaneous processing in the restriking unit 4 is continuously processed into the consecutive corrugated member Fa in the corrugation step, and is interrupted during restriking in the restriking unit 4 which is executed subsequently.

The forming gears 31, 32 are accommodated in a support frame 36 having a top plate 36a and a base 36b. A pair of backup members 33a are engaged with a shaft portion 30c positioned on one axial end of the upper forming gear 31 at upstream and downstream positions respectively, and another pair of backup members 33b are engaged with a shaft portion 30d positioned on the other axial end of the upper forming gear 31 at upstream and downstream positions respectively, thereby rotatably supporting the forming gear 31. Likewise, a pair of backup members 34a are engaged with a shaft portion 30e positioned on one axial end of the lower forming gear 32 at upstream and downstream positions respectively, and another pair of backup members 34b are engaged with a shaft portion 30f positioned on the other axial end of the upper forming gear 32 at upstream and downstream positions respectively, thereby rotatably supporting the forming gear 32. For example, those backup members 33a, 33b, 34a, 34b are formed by bearings.

As shown in FIGS. 8A and 8B, the upper backup members 33a, 33b are mounted on the top plate 36a of the support frame 36 via a hearing holder 37, and likewise, the lower backup members 34a, 34b are mounted on the base 36b of the support frame 36 via a bearing holder 38.

An upper vibration pad 35a is provided above the top plate 36a of the support frame 36, and a lower vibration pad 35b is provided below the base 36b of the support frame 36 to back up the forming gears 31, 32 so that the forming gears 31, 32 do not significantly shift upward or downward, and suppress vibration which occurs during corrugation or vibration which is transmitted to the forming gears 31, 32 from the lower pressing die 2. For example, the above-mentioned vibration pads 35a, 35b are formed by a vibration absorber such as nitrile rubber of an elastic material having excellent oil resistance.

As shown in FIG. 8B, the support frame 36 is mounted above the lower pressing die 2 via the lower vibration pad 35b, and a plurality of rod members 20 extending vertically is provided between the lower pressing die 2 and the base 36b of the support frame 36.

The restriking unit 4 is provided at a position separated from the corrugating unit 3 on the downstream side by a predetermined distance L. This predetermined distance L is set within a predetermined range as will be described later in detail.

In the restriking unit 4, an upper restrike die 41 having restrike teeth 41a formed with a plurality of crests and troughs at the bottom is provided on the upper pressing die 1 side, and a lower restrike die 42 having restrike teeth 42a formed with a plurality of crests and troughs at the top is provided on the lower pressing die 2 side.

Figure 3B:
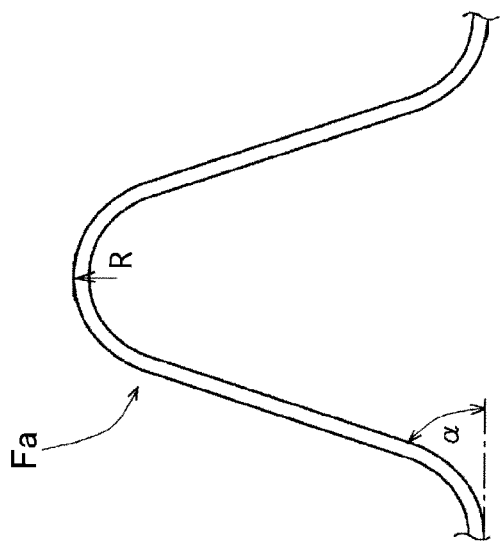
FIG. 3B is a side view showing the shape of two crests (two pitches) of a consecutive rectangle member restriked with the fin processing apparatus according to the present embodiment after corrugation by the fin processing apparatus according to the present embodiment.

Therefore, the upper restrike die 41 moves up and down toward the unmovable lower restrike die 42 according to the vertical movement of the upper pressing die 1 to restrike a consecutive corrugated member in the corrugation step with a shape as shown in FIG. 3A with those restrike teeth 41a, 42a. This movement permits a plurality of crests and troughs to be formed simultaneously to provide an rectangular material (consecutive rectangle member Fb) in the restrike step as shown in FIG. 3B, thereby obtaining the consecutive rectangle member Fb.

This process is equivalent to the restrike step. The restriking unit 4 is equivalent to the restriking mechanism according to the present invention.

It is to be noted that during the restrike step, the servo motor is stopped to stop the corrugating unit 3.

A cutoff unit 5 is provided at the downstream of the restriking unit 4 between the upper pressing die 1 and the lower pressing die 2.

In the cutoff unit 5, a pilot portion 51 and blades 52 are provided on the side of the upper pressing die 1, and both move up and down together with the upper pressing die 1.

The lower pressing die 2 is provided with a portion which receives the force of the blade 52 at the cutoff time according to the cutting position of the blade 52 and is slightly offset toward the downstream side.

The cutoff unit 5 is equivalent to the cutoff mechanism according to the present invention.

The pilot portion 51 moves downward with the downward movement of the upper pressing die 1 to enter that portion of the supplied consecutive rectangle member Fb in the restrike step which corresponds to the length of two restriked fins Fc, thereby positioning the consecutive rectangle member Fb.

Two blades 52 are provided to cut the restriked fin Fc, which is needed finally, respectively at the upstream and downstream positions separated from each other by the length corresponding to one restriked fin Fc.

The blades 52 can be moved and suppressed downward by hydraulic actuators (not shown) with the consecutive rectangle member Fb in the restrike step positioned by the pilot portion 51. According to the present embodiment, the blades 52 are provided on the upstream side and the downstream side as mentioned above, and the blades 52 are moved downward to cut the consecutive rectangle member Fb at a position where the crest of the consecutive rectangle member Fb moves downstream of the blade 52 on the downstream side by a distance corresponding to one restriked fin Fc, thereby forming two restriked fins Fe at a time. This step is equivalent to the cutoff step.

A belt conveyor B is provided between under the cutoff unit 5 and a downstream side of the downstream end of the lower pressing die 2. In the cutoff step, two restriked fins Fc are cut off from the consecutive rectangle member Fb in the restrike step at a time as mentioned above, but as shown in FIG. 2, the restriked fin Fc positioned upstream between the upstream and downstream blades 52 drops at that position to be conveyed downstream on the belt conveyor 13 provided on the lower side.

Meanwhile, the restriked fin Fc positioned further downstream of the blades 52 drops downstream while being guided by a shooter 7 and rides on the belt of the belt conveyor B to be conveyed further downstream.

A car 8 stands by at the downstream of the belt conveyor B to store the restriked fins Fc conveyed by the belt conveyor B, and moves to a next assembly step or the like.

According to the fin processing apparatus with the above configuration, when a plurality of crests and troughs is subjected to corrugation and restriking by performing the intermittent processing as described above, variations in the pitches of the crests and troughs may cause misalignment of molding to produce defective products.

In the fin processing apparatus according to the present embodiment, therefore, the range of a distance L between the center portion of the corrugating unit 3 and the center portion of the restriking unit 4, and the range of the shape sizes of the consecutive corrugated member Fa in the corrugation step are restricted as described below to avoid deficiency originating from the aforementioned misalignment.

First, the range of the shape sizes of the consecutive corrugated member Fa in the corrugation step to avoid breaking of the consecutive corrugated member Fa which is a workpiece member between the corrugation step and the restrike step at a middle portion, and to avoid the occurrence of the phenomenon such that the consecutive rectangle member Fb in the restrike step becomes partly thin or thick to result in non-uniform thicknesses, so-called padding, so that the shape of the restriked fin Fc also has undulations, were acquired through experiments.

Figures 4, 5:
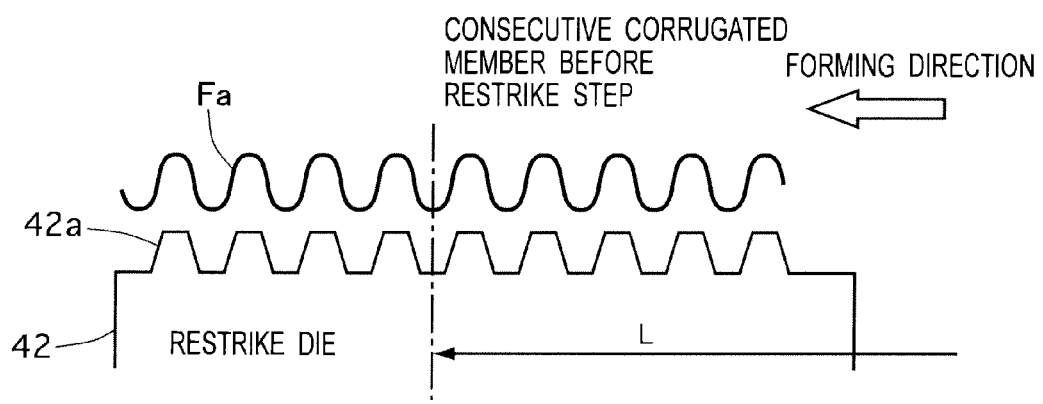
FIG. 4 is a diagram illustrating a table showing experimental results for determining the range of a developed length (one pitch) where a consecutive corrugated member can be formed so as to avoid breaking of a consecutive corrugated member during the transition from a corrugation step to a restrike step and occurrence of padding in the restrike step.
FIG. 5 is a diagram for explaining the size ranges of a consecutive corrugated member and a restrike die to avoid breaking of a consecutive corrugated member during the transition from the corrugation step to the restrike step and misaligned restriking in the restrike step.

FIG. 4 is a diagram illustrating a table showing experimental results for determining the range of the developed length where a consecutive corrugated member Fa in the corrugation step can be formed for avoiding the aforementioned deficiency. FIG. 4 shows the essential size and material breaking range of consecutive corrugated members Fa in the corrugation step, and the limit of padding on restriked articles.

The material of the consecutive corrugated member Fa in the corrugation step breaks when the developed length of one pitch is less than 5.78 mm, and padding occurs after restriking when the developed length of one pitch is greater than 6.28 mm.

Therefore, the developed length of the consecutive corrugated member Fa in the corrugation step which can be formed so as to avoid the aforementioned deficiency is set to the range of 5.78 mm or greater and 6.28 mm or less.

Next, the size range of one pitch of the consecutive corrugated member Fa in the corrugation step where restriking is possible without misaligned restriking in the restrike step is determined.

Because the allowable range of pitch misalignment for the consecutive corrugated member Fa in the corrugation step in the pressing dies 1 and 2 is 0.50 mm or less, the offset between the restrike die 41, 42 and the consecutive corrugated member Fa at a position set apart on the downstream side from the center portion of the corrugating unit 3 by the distance L (position in the restrike die 41, 42) should be 0.50 mm or less where L is the distance (for example, 80 mm) between the center portion of the corrugating unit 3 and the center portion of the restriking unit 4 as shown in FIG. 5. With L=80 mm, the amount of an accumulated variation in the pitch of the consecutive corrugated member Fa is 0.29 mm, which satisfies the aforementioned condition.

The size range of one pitch of the consecutive corrugated member Fa in the corrugation step which can be formed so as to satisfy the aforementioned condition is 3.16 mm to 3.33 mm based on the experimental results shown in FIG. 6.

FIG. 6 shows the maximum offset (four crests) in the restrike die 41, 42, the offset between the pitch of the restrike die 41, 42 and the pitch of the consecutive corrugated member Fa, the offset between the pitch of the restrike die 41, 42 and the pitch of the consecutive corrugated member Fa when the accumulated amount of a variation is 0 mm, the offset between the pitch of the restrike die 41, 42 and the pitch of the consecutive corrugated member Fa when the accumulated amount of a variation is 0.29 mm, each with respect to the pitch of the consecutive corrugated member Fa in the corrugation step and the pitch of the restrike die 41, 42 which is combined with the pitch of the consecutive corrugated member Fa.

When the maximum amount of a variation is 0.29 mm when the distance L from the center portion of the corrugating unit 3 to the center portion of the restriking unit 4 equals 80 mm, so that when the maximum amount of a variation becomes 0.50 mm, as apparent from FIG. 7, the maximum distance for the distance L becomes 140 mm (in case of 6 crests).

When the formable limit distance for the distance L is 140 mm, the pitch of the consecutive corrugated member Fa in the corrugation step becomes 3.16 mm to 3.28 mm, which can provide a consecutive corrugated member Fa with a good performance.

In carrying out the experiment, the shape of the restriked fin Fc having an excellent cooling performance was set so that the plate thickness was 0.1 mm, and the consecutive corrugated member Fa in the corrugation step shown in FIG. 3A had a top outer radius R=0.5 mm or less, and a trough angle $\alpha$=68° or less.

The restriked fin Fc was produced using, as the flat plate Fo, a flat plate of an aluminum-based material "A3003+0.5% Cu—O", defined in the Japanese Industrial Standards (JIS) of JIS4000 and a plate thickness t=0.1 mm±0.005 mm.

To summarize the experimental results, the range of the shape size of the consecutive corrugated member Fa in the corrugation step excellent in cooling performance where restriking is possible without breaking the material during the transition from the corrugation step to the restrike step and without causing padding in the restrike step is set to:

pitch of consecutive corrugated member Fa: 3.16 mm to 3.33 mm height of consecutive corrugated member Fa: 2.33 mm to 2.56 mm developed length of consecutive corrugated member Fa: 5.78 mm to 6.28 mm Meanwhile, the distance L from the center portion of the corrugating unit 3 to the center portion of the restriking unit 4 at which restriking is possible without breaking the material during the transition from the corrugation step to the restrike step and without causing padding in the restrike step is set to 140 mm or less.

Next, the action of the fin processing apparatus with the above-described configuration is described.

The flat plate Fo rolled out from the roll passes through the posture stabilizer 6 to be supplied to the corrugating unit 3 in a horizontally stable posture.

In the corrugating unit 3, the flat plate Fo is hit with the formed teeth 31a, 32a of the forming gears 31, 32, and driven with the servo motor, so that the consecutive corrugated member Fa in the corrugation step shown in FIG. 3A is continuously formed by the formed teeth 31a, 32a and come out from between the forming gears 31, 32.

In this corrugation step, vibration of the forming gears 31, 32 is suppressed by the vibration pads 35a, 35b via the backup members 33a, 33b, 34a, 34b.

The feeder capability of the forming gears 31, 32 causes the consecutive corrugated member Fa formed by the corrugating unit 3 to sequentially move downstream and enter the restriking unit 4. When the consecutive corrugated member Fa enters the restriking unit 4 by a distance corresponding to two restriked fins Fc (12 crests in total in the present embodiment), the servo motor is stopped and the upper pressing die 1 is lowered.

Consequently, the upper restrike die 41 comes down, and the consecutive corrugated member Fa inserted between the restrike teeth 41a of the upper restrike die 41 and the restrike teeth 42a of the lower restrike die 42 are restriked with the restrike teeth 41a, 42a, thereby obtaining the consecutive rectangle member Fb in the restrike step shown in FIG. 3B.

In this restrike step, the shape size of the consecutive corrugated member Fa in the corrugation step is set as mentioned above, and the distance L between the corrugating unit 3 and the restriking unit 4 is set within the aforementioned range, so that breaking of the consecutive corrugated member or occurrence of padding can be voided.

When the restrike step ends, the upper restrike die 41 moves up, and the spring of a lifter (not shown) set in the lower restrike die 42 is released to move the lifter upward so that the consecutive rectangle member Fb in the restrike step is completely released from the lower restrike die 42.

When the restrike step ends and the upper restrike die 41 moves up, the servo motor starts rotating and driving so that the corrugating unit 3 processes the flat plate Fo to continuously form crests and troughs corresponding in number to two restriked fins Fc on the consecutive corrugated member Fa in the corrugation step. Accordingly, the restriked consecutive rectangle member Fb moves downstream by a distance corresponding to two restriked fins Fc.

In other words, a circuit which intermittently drives the servo motor in such a way that the consecutive corrugated member fed by a constant amount of the corrugated fin pitch (corresponding to two restriked fins Fc in the present embodiment) for every one shot of pressing is installed in the controller, so that when restriking is completed, a signal to rotate the lower forming gear 32 is generated according to the setting of the angle of the rotary cam of the press body.

Then, the rotation of the servo motor causes the consecutive rectangle member Fb in the restrike step to move out downstream from the restriking unit 4, and (six crests in the present embodiment) comes out of the cutoff unit 5 downstream. Accordingly, the consecutive rectangle member Fb corresponding to one restriked fin Fc located upstream thereof stops at the position between the upstream and downstream blades 52 of the cutoff unit 5.

When the upper pressing die 1 moves down in this state, the pilot portion 51 enters the upstream troughs of the upstream blade 52 to position the consecutive rectangle member Fb in the restrike step.

Next, the blades 52 are lowered to cut the consecutive rectangle member Fb in the restrike step at the upstream and downstream sides to obtain two restriked fins Fc at a time.

As a result, the single upstream restriked fin Fc cut directly drops down on the belt of the belt conveyor B. Meanwhile, the restriked fin Fc positioned further downstream of this restriked fin Fc is guided by the shooter 7 to drop further downstream onto the belt of the belt conveyor B.

In this manner, each restriked fin Fc is conveyed downstream by the belt conveyor B to be stored in the car 8 standing by at the downstream end of the belt conveyor B to be transferred to the next step.

In the fin processing apparatus according to the present embodiment, as described above, the corrugating unit 3 capable of continuously forming a plurality of crests and troughs, the restriking unit 4 capable of simultaneously forming a plurality of crests and troughs, and the cutoff unit 5 are disposed between the upper pressing die 1 and the lower pressing die 2. The corrugating unit 3 and the restriking unit 4 are provided integrally to reduce the distance therebetween; for example, the formable limit distance between the center portion of the corrugating unit 3 and the center portion of the restriking unit 4 is set to 140 mm or less (it is desirable to set L=80 mm in order to stabilize the formation).

Therefore, the exclusive area for installation of the fin processing apparatus according to the present embodiment can be reduced.

Further, a plurality of and a predetermined number of crests and troughs are corrugated, and a plurality of crests is simultaneously formed by restriking, so that the production efficiency can be improved. In addition, in this case, the aforementioned setting of the distance between the corrugating unit 3 and the restriking unit 4 prevents a workpiece member from being cut at a middle portion and prevents occurrence of padding in the restring formation.

In the fin processing apparatus according to the present embodiment, all of the corrugation step, the restrike step and the cutoff step can be executed interlockingly with the same apparatus, and, in addition, the corrugation step has only to be interrupted for a plurality of final parts, thus further improving the production efficiency as compared with the case of interrupting the corrugation step for each final part.

Further, the corrugating unit 3 uses the forming gears 31, 32, so that the maintenance and management costs can be reduced as compared with the related art that uses roller pins. And at the same time, the corrugating unit 3 has the feeder capability of the forming gears.

In the corrugating unit 3, the forming gears 31, 32 are rotatably supported by the backup members 33a, 33b, 34a, 34b, so that the deflection of the pair of forming gears 31, 32 can be reduced without increasing the vertical size of the whole apparatus, and vibration is absorbed by the vibration pads 35a, 35b provided above and below the support frame 36. Further, the rod members 20 vertically provided between the lower pressing die 2 and the base 36b of the support frame 36 are engaged with the base 36b of the support frame 36, so that the pair of forming gears 31, 32 accommodated in the support frame 36 can be prevented from being turned down horizontally.

Therefore, the forming gears 31, 32 can be held reliably and firmly, and vibration which originates from corrugation with the forming gears 31, 32 can be reduced.

At the time of feeding a consecutive corrugated member Fa in the corrugation step from the corrugating unit 3 to the restriking unit 4, the base 42b provided between the corrugating unit 3 and the restriking unit 4 receives the consecutive corrugated member Fa to suppress dead-weight originated sagging of the fed consecutive corrugated member Fa. This makes it possible to reduce expansion between fin pitches of the consecutive corrugated member Fa.

The restriking unit 4 simultaneously forms crests and troughs corresponding to two restriked fins Fc, and the cutoff unit 5 cuts two restriked fins Fc, that is, two final parts are obtained. Therefore, the number of times of interruption of the servo motor which intermittently drives the forming gears 31, 32 can be reduced as compared with the case where working and cutting are carried out for each restriked fin Fc. As a result, the production efficiency can be improved.

The developed length of one-pitch of the consecutive rectangle member Fb in the corrugation step is set to fall in the range of 5.78 mm to 6.28 mm, so that it is possible to prevent the consecutive corrugated member from being broken during the transition from the corrugation step to the restrike step, and occurrence of padding in the restrike step while keeping high cooling efficiency.

In addition, the feeding length (amount of feeding) of the consecutive corrugated member Fa in the corrugation step formed with the pair of forming gears 31, 32 is synchronized with the feeding length of the consecutive rectangle member Fb in the restrike step, so that the precision between the fin pitches of the consecutive corrugated member Fa and the consecutive rectangle member Fb can be kept and improved. For example, the pitch of the consecutive corrugated member Fa in the corrugation step is set to fall in the range of 3.16 mm to 3.33 mm, thus making it possible to prevent misaligned-pitched restriking deficiency from occurring between the consecutive corrugated member Fa and the restrike teeth 41a, 42a in the restrike step while securing the shape that keeps high cooling efficiency.

While the invention has been described based on the present embodiment, the invention is not limited to this embodiment, and design modifications or the like without departing from the scope of the invention are encompassed in the invention.

An article formed from a workpiece member according to the present invention is not limited to a fin for an automobile heat exchanger, and may take another form as long as the article is a consecutive corrugated member that is obtained by corrugating the workpiece member first and then restriking the consecutive corrugated member.

The cutoff unit 5 should not necessarily be disposed between the upper pressing die 1 and the lower pressing die 2.

When the restriking unit 4 and the cutoff unit 5 perform simultaneous formation and simultaneous cutting, the length thereof need not be limited to the length corresponding to two restriked fins Fc; the length may be set to the length corresponding to one or more than two.

Further, instead of providing a plurality of vertically extending rod members 20 between the lower pressing die 2 and the base 36b of the support frame 36, a protrusive member projecting upward from the lower pressing die and inserted into the base of the support frame may be provided.

It should be noted that the above mentioned construction method is one example of the present invention, developed such that the range of the shape size of the restriked fin (final part) is set to:

height of restriked fin: 2.01 mm±0.03 mm
pitch of restriked fin: 1.60 mm±0.05 mm
top outer radius of restriked fin: 0.5 mm
trough angle of restriked fin: $\alpha=80°±5°$ Moreover, it should be noted that the above mentioned construction method is applicable to a final part which is different from the one of the above mentioned embodiment, if the shape of corrugation die and the shape of a restrike die are changed as intended to obtain the final part. Therefore the present invention is also applicable to making fins used for other than heat exchanger.

This application claims priority based on Japanese Patent Application No. 2012-084541 filed on Apr. 3, 2012 and Japanese Patent Application No. 2013-051760 filed on Mar. 14, 2013, the entire contents of which are incorporated herein by reference.

DESCRIPTION OF REFERENCE NUMERALS OR SYMBOLS

Fo: flat plate (workpiece member)
Fa: consecutive corrugated member in a corrugation step
Fb: consecutive corrugated member in a restrike step
Fc: restriked fin (final part)
L: predetermined distance between corrugating unit and restriking unit
1: upper pressing die
2: lower pressing die
20: rod member
3: corrugating unit (corrugating mechanism)
30$a$, 30$b$: shaft
31, 32: forming gear
33$a$, 33$b$, 34$a$, 34$b$: backup member
35$a$, 35$b$: vibration pad (vibration absorber)
36: support frame
4: restriking unit (restriking mechanism)
41: upper restrike die
42: lower restrike die
41$a$, 42$a$: restrike teeth
42$b$: base
5: cutoff unit (cutoff mechanism)
51: pilot portion
52: blade

What is claimed is:

1. A fin processing apparatus comprising:
an upper pressing die and a lower pressing die placed apart from each other and capable of coming close to and away from each other;
a corrugating mechanism disposed between the upper pressing die and the lower pressing die, the corrugating mechanism being configured to continuously form a corrugated member in a corrugation step from a flat plate which is a workpiece material, the corrugated member having a first plurality of crest and trough portions in a predetermined number; and
a restriking mechanism disposed between the upper pressing die and the lower pressing die, the restriking mechanism being configured to simultaneously restrike-form a second plurality of crest and trough portions of a rectangle member in a restrike step from the corrugated member, wherein
the corrugating mechanism and the restriking mechanism are provided integrally,
the corrugating mechanism includes a pair of forming gears carrying out corrugation with the flat plate placed between the forming gears, and
a vibration absorber formed of an elastic member is provided below a support frame which accommodates the pair of forming gears.

2. The fin processing apparatus according to claim 1, wherein a base between the corrugating mechanism and the restriking mechanism is configured to receive the corrugated member in the corrugation step which is conveyed from the corrugating mechanism to the restriking mechanism.

3. The fin processing apparatus according to claim 1, wherein the corrugating mechanism is provided with a plurality of backup members rotatably supporting the pair of forming gears.

4. The fin processing apparatus according to claim 1, wherein the support frame is mounted above the lower pressing die via the vibration absorber, and a rod member extending in a vertical direction is provided between the lower pressing die and the support frame.

5. The fin processing apparatus according to claim 1, wherein a length of conveyance of the corrugated member in the corrugation step formed by the pair of forming gears is synchronized with a length of conveyance of the rectangle member in the restrike step formed by the restriking mechanism.

6. The fin processing apparatus according to claim 1, wherein:
a cutoff mechanism that cuts off the rectangle member downstream of the restriking mechanism so as to obtain a final part is provided between the upper pressing die and the lower pressing die, and
crest and trough portions to be simultaneously restriked by the restriking mechanism are set in such a way as to be equal in number to crest and trough portions of the final part obtained by simultaneous cutting by the cutoff mechanism.

7. The fin processing apparatus according to claim 6, wherein the cutoff mechanism provides two final parts in a cutoff step of the restriked consecutive rectangle member.

8. The fin processing apparatus according to claim 1, wherein a formable limit distance between the corrugating mechanism and the restriking mechanism is set equal to or less than 140 mm.

9. The fin processing apparatus according to claim 1, wherein the corrugated member in the corrugation step has a developed length of one pitch set in a range of 5.78 mm or greater and 6.28 mm or less.

10. The fin processing apparatus according to claim 1, wherein the corrugated member in the corrugation step has one pitch set in a range of 3.16 mm or greater and 3.33 mm or less.

* * * * *